United States Patent
Dyrla et al.

(10) Patent No.: US 10,054,045 B2
(45) Date of Patent: Aug. 21, 2018

(54) MULTI-ENGINE POWER PLANT HAVING AN EMERGENCY FLUID INJECTION SYSTEM, AND AN AIRCRAFT

(71) Applicant: AIRBUS HELICOPTERS, Marignane (FR)

(72) Inventors: Frederic Dyrla, Bouc Bel Air (FR); Romain Stephant, Aix En Provence (FR)

(73) Assignee: Airbus Helicopters, Marignane (FR)

( * ) Notice: Subject to any disclaimer, the term of this patent is extended or adjusted under 35 U.S.C. 154(b) by 947 days.

(21) Appl. No.: 14/299,132

(22) Filed: Jun. 9, 2014

(65) Prior Publication Data
US 2014/0373505 A1   Dec. 25, 2014

(30) Foreign Application Priority Data
Jun. 19, 2013   (FR) ...................... 13 01420

(51) Int. Cl.
   *F02C 3/30*   (2006.01)
   *F02C 6/02*   (2006.01)
   (Continued)

(52) U.S. Cl.
   CPC ............ *F02C 3/305* (2013.01); *B64C 27/006* (2013.01); *B64D 35/08* (2013.01); *F02C 6/02* (2013.01); *F02C 7/14* (2013.01); *F05D 2270/09* (2013.01)

(58) Field of Classification Search
   CPC .... F02C 3/305; F02C 6/02; F02C 7/14; B64C 27/006; B64D 35/08; F05D 2270/09–2270/096
   (Continued)

(56) References Cited

U.S. PATENT DOCUMENTS 2,863,282 A * 12/1958 Torell ...................... F02C 3/305
                                                              60/242
3,434,281 A    3/1969 Donaldson
   (Continued)

FOREIGN PATENT DOCUMENTS

EP   2333247    6/2011
FR   2826094    12/2002
   (Continued)

OTHER PUBLICATIONS

European Search Report dated Jun. 5, 2015, Application No. 14 001 812.8-1754, 5 Pages.
   (Continued)

*Primary Examiner* — Phutthiwat Wongwian
*Assistant Examiner* — Loren Edwards
(74) *Attorney, Agent, or Firm* — Brooks Kushman P.C.

(57) ABSTRACT

A power plant (10) having a first and second turboshaft engines (11, 16) and an emergency system (20) for injecting fluid into said engines (11, 16). First and second pressurization pipes (26, 28) connect a tank (21) to each gas generator of the engines. In addition, the system (20) includes an injector device (35, 40) for each engine, which device comprises an injector pipe (36, 41) connecting said tank (21) to at least one injector nozzle (31). A distributor (51, 52) is arranged on each injector pipe (36, 41), each valve (51) feeding one of the engines while being connected to the gas generator of the other engine.

21 Claims, 1 Drawing Sheet

(51) Int. Cl.
*F02C 7/14* (2006.01)
*B64C 27/00* (2006.01)
*B64D 35/08* (2006.01)

(58) Field of Classification Search
USPC .... 60/39.15, 775, 39.26, 39.3, 39.53, 39.54, 60/39.55, 39.56, 39.57, 39.58, 39.59
See application file for complete search history.

(56) References Cited

U.S. PATENT DOCUMENTS

| | | | |
|---|---|---|---|
| 3,518,023 A | | 6/1970 | Britten et al. |
| 4,284,174 A | * | 8/1981 | Salvana .................. F01D 25/18 |
| | | | 184/6.26 |
| 4,591,115 A | * | 5/1986 | DeCarlo .................. B64C 17/10 |
| | | | 137/255 |
| 5,784,875 A | | 7/1998 | Statler |
| 7,082,769 B2 | | 8/2006 | Greene |
| 7,500,542 B2 | | 3/2009 | Maret et al. |
| 2011/0138817 A1 | | 6/2011 | Vialle et al. |
| 2015/0315965 A1 | * | 11/2015 | Moine ..................... F02C 3/305 |
| | | | 60/775 |

FOREIGN PATENT DOCUMENTS

| | | |
|---|---|---|
| FR | 2859761 | 3/2005 |
| GB | 2079707 | 1/1982 |
| WO | 2014096694 A1 | 6/2014 |

OTHER PUBLICATIONS

French Search Report for FR 1301420, Completed by the French Patent Office dated Feb. 7, 2014, 6 Pages.

\* cited by examiner

MULTI-ENGINE POWER PLANT HAVING AN EMERGENCY FLUID INJECTION SYSTEM, AND AN AIRCRAFT

CROSS REFERENCE TO RELATED APPLICATION

This application claims priority to French patent application No. FR 13 01420 filed on Jun. 19, 2013, the disclosure of which is incorporated in its entirety by reference herein.

BACKGROUND OF THE INVENTION (1) Field of the Invention

The present invention relates to a two-engine power plant having an emergency system for injecting fluid, and it also relates to an aircraft.

More particularly, the invention relates to a power plant of a rotorcraft and in particular of a helicopter. The technical field of the invention is thus the technical field of power plants, in particular for rotorcraft type aircraft.

(2) Description of Related Art

A rotorcraft has a power plant for driving its rotary wing in rotation. The power plant has one or more engines for driving a main gearbox of a helicopter, this main gearbox then driving the rotary wing in rotation.

It should also be understood that throughout the present specification, the term "engine" covers not only turboshaft engines but also piston engines, for example.

Each engine is capable of operating at a plurality of operating ratings.

For example, thermal limitations on an engine and torque limitations on the main gearbox serve to define three normal operating ratings for the engine of a rotorcraft:

takeoff rating, corresponding to use that damages neither the main gearbox nor the engine during a takeoff of limited duration, which duration usually lies in the range 5 minutes (min) to 30 min, with this being referred to as takeoff power (PMD);

a maximum continuous rating corresponding to use that damages neither the main gearbox nor the engine over a duration that is not limited: this is known as maximum continuous power (PMC); and maximum transient rating, optionally having limits set by regulation: this is referred to as maximum transient power (PMT).

There also exist supercontingency ratings for multi-engine rotorcraft that are used in the event of an engine failing:

a first contingency rating during which the mechanical potential of the inlet stages of the main gearbox and the temperature potential of the engine are used to the maximum: this rating can be used for a maximum of 30 seconds consecutively and on at least three occasions in a flight, it is referred to as the PSU rating, and if is used that can require the engine to be removed for overhaul;

a second contingency rating during which the potential of the inlet stages of the main gearbox and the potential of the engine are used to a great extent: this rating may be used for two minutes after using the PSU rating or for two minutes thirty seconds consecutively, at most, and it is referred to as the PMU rating; and a third contingency rating during which the potential of the inlet stage of the main gearbox and the potential of the engine are used, but without being damaged: this rating may be used for thirty minutes or continuously for the remainder of the flight after the failure of an engine and is referred to as the PIU rating.

Nevertheless, the power developed by an engine during a given rating may be barely sufficient under particular conditions, e.g. in a hot atmosphere.

It is then known to inject a fluid into an engine in order to increase its power. The fluid may in particular be pure water or a mixture of water and alcohol. For example, in an engine having a free turbine, it is possible to inject a water-based fluid in order to increase the power developed by the engine without increasing the temperature of the gas at the outlet from the combustion chamber of that engine.

The concept of injecting pure water was used on piston engines during the second world war and has since been used on airplanes with turbojets.

The water may be injected into the combustion chamber of the engine. Consequently, the composition of the gas generated by the gas generator changes. This leads to a modification to the heat capacity and to the bulk enthalpy of the gas. For constant flow rate of gas created in the combustion chamber, the power generated by the engine increases with increasing bulk enthalpy of the gas.

When the engine is a turboshaft engine having a gas generator with an air inlet and a compressor upstream from the combustion chamber, the water may be injected into the air inlet.

Under such circumstances, the total mass flow rate through the air inlet increases, thereby delivering extra power at constant bulk enthalpy. The power available at constant combustion temperature and at constant air flow rate is greater.

Nevertheless, the fuel flow rate is also increased at constant combustion temperature and at constant air flow rate.

A fluid may be injected in the form of a mist.

Consequently, an emergency fluid injection system can be used on a multi-engine aircraft in the event of an engine failing in order to increase the power of the engines still in operation. Nevertheless, such a system can be difficult to develop while also satisfying severe safety targets. Such an emergency system can be difficult to test.

Thus, an emergency system may comprise a pump for conveying a water-based fluid to an engine in order to increase its power. Nevertheless, safety requirements may then impose providing the pump in redundant manner, thereby leading to a system that is relatively heavy and/or bulky.

Document FR 2 859 761 describes a system for providing protection against over-stress in a turbine engine. That system includes an injector device for injecting a cooling agent into the engine when the outlet temperature of the gas exceeds a safe temperature.

The injector device comprises a tank connected to an injector by a duct. A pump and a valve are also arranged along the duct.

Document U.S. Pat. No. 5,784,875 indicates that the combustion of fuel in a turbine engine creates pollution: specifically nitrogen oxides known as NOx.

That Document U.S. Pat. No. 5,784,875 describes a device for reducing NOx emission by injecting water into the combustion chamber. The device comprises both a pipe for conveying air taken from the engine and provided with a first valve, and also a pipe for conveying water that is provided with a second valve. The device then opens the first and second valves in order to inject into the combustion chamber a mixture containing the air taken from the engine, water, and fuel.

Document FR 2 826 094 discloses a system for lubricating and cooling a mechanical assembly that includes an emergency lubrication device that is put into operation automatically or manually when the main device fails. The independent emergency device has at least one tank of lubricant and cooling liquid; and at least one source of gas under low pressure; at least one spray nozzle that is fed firstly with lubricant and cooling liquid under pressure from the tank and secondly with gas under pressure from said source and that is suitable for spraying a mist of lubricant and cooling liquid onto the mechanical assembly in order to take over temporarily from the failed main device.

Document EP 2 333 247 relates to a method of increasing the safety of a power plant having at least one engine and a main gearbox, the engine driving the main gearbox. That main gearbox includes a lubrication system provided with the help of an aqueous medium stored in a tank. Under such circumstances, according to that method, a fluid comprising water is injected into the engine in order to increase the power developed by the engine without increasing the temperature of any member of the engine, or in order to reduce that temperature without modifying the power developed by the engine, the fluid being taken from said tank.

Also known are Documents U.S. Pat. Nos. 3,434,281, 3,518,023, and GB 2 079 707.

BRIEF SUMMARY OF THE INVENTION

An object of the present invention is thus to provide a power plant provided with an emergency system for injecting fluid and enabling severe safety targets to be satisfied and/or suitable for being tested before a flight of an aircraft fitted with the system, for example.

According to the invention, a power plant is provided with a first turboshaft engine and with a second turboshaft engine each having a gas generator, the power plant having an emergency system for injecting fluid into the engines, the system including a tank containing an aqueous fluid. This power plant is remarkable in particular in that it comprises:

a first pressurization pipe and a second pressurization pipe respectively connecting the tank to a first gas generator of the first engine and to a second gas generator of the second engine in order to pressurize the fluid contained in the tank with gas taken from each of the gas generators;

one injector member per engine, each member comprising at least an injector nozzle for injecting said fluid, a first injector device having a first injector pipe connecting the tank to a first injector member of the first engine, a second injector device having a second injector pipe connecting the tank to a second injector member of the second engine; and a distributor arranged on each injector pipe, a first distributor of the first injector pipe communicating with the second pressurization pipe so that a failure of the second engine causes the first distributor to open, and a second distributor of the second injector pipe communicating with the first pressurization pipe so that the failure of the first engine causes the second distributor to open.

The fluid may be pure water or it may be a mixture containing water, such as a mixture of water and alcohol, for example.

More particularly, the power plant is a power plant for an aircraft.

When one of the engines is inoperative, the engine that is still in operation makes use of contingency ratings.

Furthermore, the distributor connected to the failed engine is no longer fed with gas by that engine. Under the effect of the decrease in the pressure of gas coming from the failed engine as a result of its failure, the distributor then opens automatically and enables fluid to be injected into the engine that remains in operation. This injection of fluid enables the power developed by the engine that remains in operation to be increased.

The invention thus proposes a simple emergency fluid injection system for injecting fluid into an engine in order to increase its power. This increase in power may serve for example to maximize the payload of the aircraft.

This emergency fluid injection system advantageously makes use of a source of pressure available on the engine. For example, each gas generator may comprise at least one compressor stage, and each pressurization pipe may be connected downstream from a compression stage. The term "downstream" refers to the flow direction of air through the gas generator.

By way of example, each pressurization pipe has a pressure takeoff arranged at the outlet of a compression stage, or indeed between two compression stages.

This emergency fluid injection system therefore does not require pumps to be used. On the contrary, the emergency fluid injection system makes use merely of pipes and of distributors that operate mechanically, for example.

Under such circumstances, the emergency fluid injection system presents good reliability.

The gas coming from the engines for feeding the tank then serves to pressurize the tank to a pressure that is practically constant, thus enabling a fluid to be injected into the engines at a flow rate that is practically constant, e.g. calibrated by the dimensions of the injectors.

In contrast to Document U.S. Pat. No. 5,784,875, the air taken from the engines is used in particular for pressurizing the fluid circuit, but it is not injected together with the fluid into an engine.

This gas also makes it possible to detect automatically and immediately that power has been lost from an engine, thereby requiring fluid to be injected into the other engine via the distributors.

This emergency fluid injection system thus makes it possible to avoid using pumps, which by their nature are heavy, by increasing the safety of the emergency fluid injection system by means of a device that is automatic and independent. The emergency fluid injection system is reliable in the absence of any electric pump and it is reactive because the tank is continuously pressurized.

The use of gas taken from the engines might appear to be contradictory with the object to be achieved, namely increasing the power from the engines. However, and surprisingly, the flow rate of gas that needs to be taken from the engines in order to ensure operation of the system is tiny compared with the flow rate of air through an engine operating at a contingency rating, being for example about 0.01% of that air flow rate, and as a result it has no detectable impact on the performance of the engine.

Furthermore, as explained below, the emergency fluid injection system is easily tested.

The power plant may also include one or more of the following characteristics.

By way of example, the tank may include an overpressure valve for controlling the pressure of the fluid in the tank.

In addition, the tank may include a pressure release valve for lowering the pressure in the tank. This pressure release valve may be used before opening the tank for a maintenance check, in particular.

Furthermore, the power plant may include a cooler device arranged on each injector pipe. By way of example, such a device may have fins arranged on the injector pipes in hot zones of the aircraft in order to cool the fluid before it is injected into an engine.

Conversely, the injector pipe may pass through hot zones of the aircraft, should that be necessary, in order to heat the fluid.

In addition, the power plant may include a thermally insulating piston arranged in the tank between the fluid and the gas coming from the engine. This thermally insulating piston seeks at least to limit the heating of the fluid in the tank under the effect of the hot air taken from the engines.

The tank may be subdivided into two containers, each container being connected to a single injector pipe. The tank is thus provided with one container per engine.

Furthermore, the power plant may include an emergency pipe connecting the tank to a main gearbox driven by the engines.

The pipe may include a gate valve controlled by an alarm device responsive to a problem of lubricating the main gearbox, or by a device that compares the value of the pressure in the circuit for lubricating the main gearbox with the value of the pressure that exists in the emergency pipe, for example.

The power plant may also include a manual activation system operable by a pilot in order to inject fluid into the engines. This system may provide a gate valve for each pressurization pipe in order to simulate a failure of an engine, possibly on request of a pilot.

Furthermore, each pressurization pipe includes a check valve. The check valves seek to prevent any re-ingestion of fluid vapor in the gas generators during changes of gas generator speeds and thus variations in the pressure of the gas taken from the engines.

Each pressurization pipe may optionally include a filter in order to filter the gas taken from the engines.

In addition, the tank may include a level sensor. Such a level sensor makes it possible to detect a leak, if any. In the absence of a failure of an engine, the level of fluid in the tank ought to remain constant.

In a first embodiment, each distributor includes an inlet orifice connected to the tank, a piston suitable for closing the inlet orifice, and a spring tending to prevent the inlet orifice being closed, the distributor being connected to a pressurization pipe downstream from the piston so that the pressure of gas present in the pressurization pipe presses said piston against said orifice.

The distributor e thus extends from one end having an inlet orifice connected to the tank to another end provided with an outlet orifice connected to an injector member. The pressurization pipe is then connected between the piston and the outlet orifice.

The spring seeks to prevent disturbances associated with small variations in the flow rate of air taken from the engine and feeding the distributor.

In a second embodiment, said distributor is connected to the first pressurization pipe and to the second pressurization pipe.

A pressure difference between these pressurization pipes can lead to a distributor opening.

Regardless of the embodiment, the power plant may include at least one computer, each injector pipe including a gate valve controlled by said at least one computer.

A turboshaft engine is usually controlled by an engine computer, known under the acronym FADEC. The computer controlling the gate valves in the injector pipes may thus be a FADEC.

Consequently, two devices can allow fluid to be injected.

A first device consists in using distributors controlled by the air taken from the gas generators of the engines.

In the event of a failure of an engine, a distributor authorizes emergency injection of fluid.

Nevertheless, such injection is not necessary in all situations. Injection should then take place only when an emergency mode of operation is triggered and when the need for power exceeds a threshold. With the help of a second device, injection therefore takes place only when necessary under the control of a computer controlling a gate valve in an injector pipe, such as a solenoid valve. Such a valve may also enable the fluid injection flow rate to be adjusted, where necessary.

Furthermore, the power plant may include a first pressure sensor for measuring the pressure of the fluid in the tank and a second sensor per injector pipe for measuring the pressure in each injector pipe.

Merely using the sensors thus enables proper operation of the emergency fluid injection system to be tested.

In addition, the power plant may include a flow meter valve controlled by the computer and arranged in each injector pipe.

In addition to a power plant, the invention provides an aircraft including such a power plant.

The present invention also provides a method of fabricating the above-specified device.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements present in more than one of the figures are given the same references in each of

DETAILED DESCRIPTION OF THE INVENTION

Figure 1:
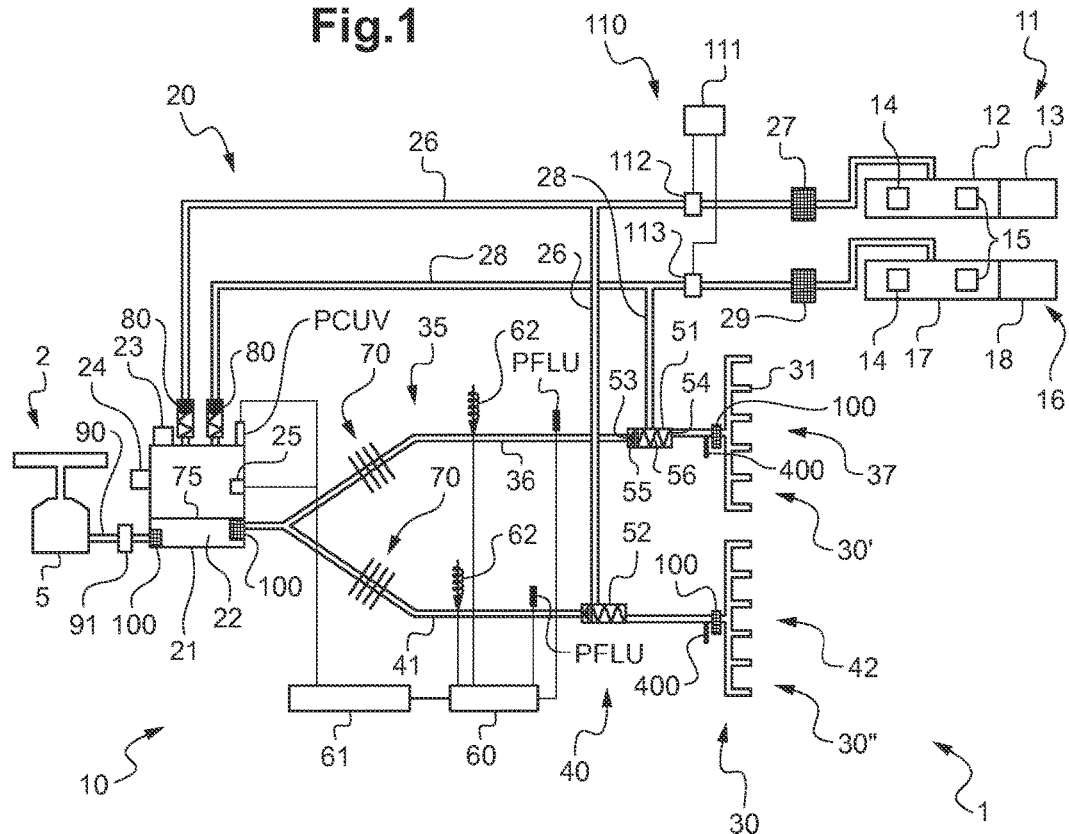
FIG. 1 is a diagram of a first embodiment.
Figure 2:
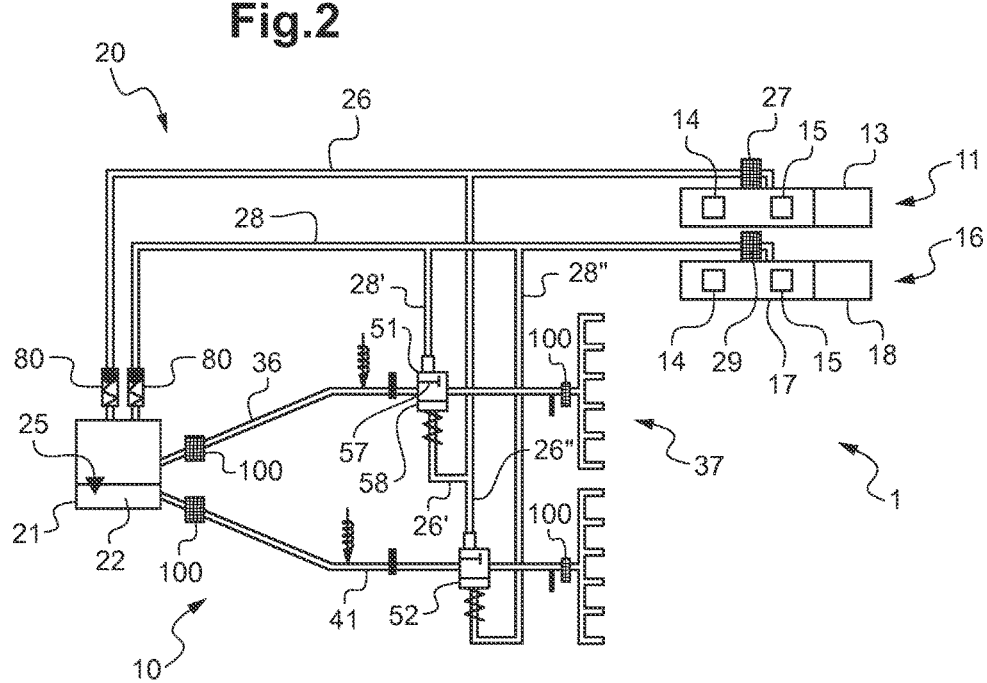
FIG. 2 is a diagram of a second embodiment.

FIGS. 1 and 2 show an aircraft 1 of the invention.

The aircraft 1 has a power plant 10, e.g. for driving rotation of a rotary wing 2. Under such circumstances, the power plant 10 comprises a first turboshaft engine 11 and a second turboshaft engine 16 optionally driving a main gearbox 5.

Each engine 11 comprises a gas generator 12 for driving rotation of a working turbine 13. The gas generator comprises at least one compression stage 14, 15 feeding compressed air to a combustion chamber (not shown).

Thus, the power plant comprises a first engine 11 having a first gas generator 12, and a second engine 16 having a second gas generator 17.

The power plant 10 also has an emergency fluid injection system 20, referred to more simply as the "system 20".

This system 20 serves to inject a water-based fluid 22, referred to more simply as "fluid", into the engines in order to improve the developed power. Reference may be made to the literature to determine the zones of the engine into which the fluid 22 should be injected.

The system 20 thus has a tank 21 in which the fluid 22 is stored. This tank may comprise one container per engine or it may have a single container, as shown in FIG. 1.

The system 20 also includes one pressurization pipe per engine for connecting each gas generator to the tank 21. Thus, the first pressurization tank 26 establishes fluid flow communication between the tank 21 and the first gas generator 12 of the first engine 11. Likewise, a second pressurization pipe 28 puts the tank 21 into fluid flow communication with the second gas generator 17 of the second engine 16.

Thus, each pressurization pipe takes gas from an engine to pressurize the tank 21. This gas may be constituted in particular by air taken from the outlet of a compression stage of the gas generator, i.e. from the downstream end of the compression stage. The air may be taken from a point known as P3 to the person skilled in the art.

The gas taken from the gas generators feeds the tank 21 and exerts almost constant pressure on the stored fluid 22.

Optionally, the tank 21 includes a piston 75 that is interposed between the gas taken from the engines and the fluid 22. This piston may be thermally insulating in order to avoid unwanted heating of the fluid 22 caused by the gas taken from the engines.

Each pressurization pipe 26, 28 may be fitted with a filter 27, 29 and/or a check valve 80.

Furthermore, the system 20 may include an overpressure valve 23 for adjusting the pressure of the fluid in the tank, and/or a pressure-reducing valve 24 for lowering the pressure in the tank 21.

The system 20 also has one injector device 35, 40 per engine for feeding the engines with fluid 22, when necessary. Each injector device 35, 40 possesses an injector pipe 36, 41 connecting the tank 21 to an injector member 30 including at least one injector nozzle 31. Each injector pipe 36, 41 has a respective distributor 51, 52 serving to feed one of the engines with fluid and connected to the gas generator of the other engine.

Thus, the system 20 possesses a first injector pipe 36 extending from the tank 21 to a first injector member 30' arranged in the first engine 11. FIG. 1 does not shown the arrangement of the first injector member 30' in the first engine in order to avoid being uselessly overloaded. The first injector pipe 36 is provided with a first distributor 51 in fluid flow communication with the second pressurization pipe 28 via a branch 28' of said second pressurization pipe 28.

Likewise, the system 20 possesses a second injector pipe 41 extending from the tank 21 to a second injector member 30" arranged in the second engine 16. FIG. 1 does not show the arrangement of the second injector member 30" in the second engine in order to avoid being uselessly overloaded. The second injector pipe 41 is provided with a second distributor 52 in fluid flow communication with the first pressurization pipe 26 via a branch 26' of the first pressurization pipe 26.

Thus, each distributor associated with one of the engines is controlled by the other engine to be opened only when that other engine has failed. The first distributor thus opens automatically when the second engine has failed, whereas the second distributor opens automatically when the first engine has failed.

Each injector pipe may include a filter 100 and/or a cooler device 70, or indeed a washer circuit 400 for purging the nozzles 31 of any impurities that might clog these small-diameter nozzles.

The first injector pipe 36 and the second injector pipe 41 may possibly be united at the tank, or indeed they may for example connect with two different containers of the tank 21.

Furthermore, the system 20 may include an emergency pipe 90 in fluid flow communication with the tank 21 and with the main gearbox 5. The emergency pipe may include a gate valve controlled by an automatic emergency device, or by manual means, for example.

Furthermore, the system 20 may include at least one computer 60 co-operating via an avionics system 61 with a first sensor PCUV for measuring the pressure of the fluid in the tank 21, and a lever sensor 25 for measuring the level of the fluid 22 in the tank 21.

The computer 60 may also communicate with one second sensor PFLU per injector pipe 36, 41 in order to measure the pressure that exists in each injector pipe 36, 41.

The system 20 may also include one gate valve 62 per injector pipe, each gate valve 62 being controlled by the computer 60. The gate valves may be metering valves for controlling the flow rate of fluid along an injector pipe. Each metering valve is advantageously placed upstream from a second sensor in order to be able to test the operation of these metering valves with the help of the second sensors.

On starting the aircraft 1, each gas generator generates gas that is conveyed via a pressurization pipe to the tank 21 in order to pressurize the fluid 22. This gas also closes the fluid distributors.

Under such circumstances, the fluid stored in the tank 21 cannot feed the injector nozzles.

Where appropriate, the gate valves in the injector pipes and in the emergency pipe are closed.

In the event of an engine failing, the gas generator of the engine that has failed is no longer capable of feeding gas to the tank 21 or to at least one distributor. Under such circumstances, the distributor that is connected to the engine that is in operation opens and can pass a fluid for feeding the injector nozzle.

Furthermore, the engine that is in operation continues to feed gas to the tank 21, and thus to pressurize the fluid 22.

In an alternative that does not have gate valves 62 in the injector pipes, fluid 22 is then conveyed to the injector nozzles present in the engine that is in operation.

In the presence of such gate valves 62, the computer 60 can determine the presence of a failure in an engine with the help of conventional means.

If the aircraft requires additional power, the computer then opens the appropriate gate valve 62, i.e. the gate valve feeding the engine that is in operation.

The power plant may also include a manual activation system 110 that can be operated by a pilot. By way of example, this activation system 110 includes control means 111 controlling gate valves placed in the pressurization pipe in order to simulate a failure of an engine. The control means can also control the gate valves in the injector pipes, where appropriate.

The system 20 is thus simple and reliable. The system can also be tested easily by the computer.

Thus, when the gate valves 62 in the injector pipes are closed, the computer can:

verify that the system 20 is leaktight when the engines are stopped, since the level of fluid measured in the tank as measured by the level sensor should remain substantially constant;

verify the pressure in the tank 21 when the engines are in operation, since the pressure of the fluid in the tank as measured by the first sensor PCUV should be greater than a pressure threshold;

verify the operation of the pressure release valve 24 when the engines are stopped, since the pressure of the fluid in the tank as measured by the first sensor PCUV should be less than a pressure threshold; and verify that the tank 21 is leaktight with one engine stopped, since any variation in the pressure of the fluid in the tank as measured by the first pressure sensor PCUV over a detection time period should be below a threshold.

The computer may also:

verify opening of each gate valve 62 in the injector pipes when the engines are in operation by opening the gate valve under test, since the pressure of the fluid downstream from the tested valve as measured with a second sensor PFLU should be greater than a threshold pressure;

verify closing of the gate valve 62 in an injector pipe communicating with an engine that is stopped, since the pressure of the fluid downstream from the tested valve as measured with the second sensor PFLU should be less than a pressure threshold;

verify opening of a distributor by stopping the engine fed by that distributor and closing the corresponding gate valve 62, since the pressure of the fluid upstream from the tested distributor as measured by a second sensor PFLU should be less than a pressure threshold; and verify closing of a distributor by starting the engines and opening the gate valves of the injector pipes 62, since the level of fluid in the tank as measured with the help of the level sensor 25 should be substantially constant.

In a first embodiment of the invention as shown in FIG. 1, each distributor 51, 52 comprises a body extending longitudinally from an inlet orifice 53 in fluid flow communication with the tank 21 to an outlet orifice 54 in fluid flow communication with the injector member 30. This body encloses a piston 55 for closing the inlet orifice or for allowing fluid to pass from the inlet orifice to the outlet orifice. In addition, the body encloses a spring 56 tending to prevent the inlet orifice 53 being closed by the piston. Consequently, the body of each distributor 51, 52 is connected to a pressurization pipe 26, 28 downstream from the piston 55. Under such circumstances, the pressure of a gas present in this pressurization pipe 26, 28 presses the piston 55 against the inlet orifice 53.

In a second embodiment of the invention as shown in FIG. 2, each distributor 51, 52 is connected to the first pressurization pipe 26 and to the second pressurization pipe 28 via branches 26', 26", 28', and 28" of these pressurization pipes.

For example, each distributor has a body with an inlet orifice and an outlet orifice. In addition, the body encloses by way of example a piston that defines a non-through passage 57 and a through passage 58. The pressure difference that exists in the pressurization pipe moves the piston in the distributors so as to place the through passage or the non-through passage in register with the inlet orifice.

Thus, when an engine fails:

the injector pipe coming from the engine that is operated moves the piston of the distributor in communication with the failed engine to position the non-through passage of that piston in register with its inlet orifice, so as to prevent fluid passing to the failed engine; and the injector pipe coming from the engine that is operating moves the piston of the distributor in communication with the engine that is operating so as to position the through passage in that system in register with its inlet orifice so as to allow fluid to pass to the engine that is operating.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A power plant having a first turboshaft engine and a second turboshaft engine each having a gas generator, the power plant including an emergency system for injecting fluid into the engines, the system including a tank containing an aqueous fluid, wherein the power plant includes:
   at least one computer;
   a first pressurization pipe and a second pressurization pipe respectively connecting the tank to a first gas generator of the first engine and to a second gas generator of the second engine in order to pressurize the fluid in the tank with gas taken from each of the gas generators;
   one injector member per engine, each member comprising at least an injector nozzle for injecting the fluid, a first injector device having a first injector pipe connecting the tank to a first injector member of the first engine, a second injector device having a second injector pipe connecting the tank to a second injector member of the second engine, each injector pipe including a metering valve controlled by the at least one computer to an adjustable flow rate of the fluid therethrough; and
   a distributor arranged on each injector pipe, a first distributor of the first injector pipe communicating with the second pressurization pipe so that a failure of the second engine causes the first distributor to open, and a second distributor of the second injector pipe communicating with the first pressurization pipe so that the failure of the first engine causes the second distributor to open;
   wherein each distributor is connected to the first pressurization pipe and to the second pressurization pipe such that each distributor is configured to receive gas from each of the gas generators and such that a pressure difference between the first and second pressurization pipes moves a piston in the associated distributor to control flow through the distributor.

2. A power plant according to claim 1, wherein the tank includes an overpressure valve for controlling the pressure of the fluid in the tank.

3. A power plant according to claim 2, wherein the tank includes a pressure release valve for lowering the pressure in the tank.

4. A power plant according to claim 1, wherein the tank includes a level sensor.

5. A power plant according to claim 1, wherein each gas generator comprises at least one compression stage, and each pressurization pipe opens out to a downstream end of a compression stage.

6. A power plant according to claim 1, wherein each pressurization pipe includes a check valve.

7. A power plant according to claim 1, wherein each pressurization pipe includes a filter.

8. A power plant according to claim 1, wherein each distributor includes an inlet orifice connected to the tank, a piston suitable for closing the inlet orifice, and a spring tending to prevent the inlet orifice being closed, the distributor being connected to a pressurization pipe downstream from the piston so that the pressure of gas present in the pressurization pipe presses the piston against the inlet orifice.

9. A power plant according to claim 1, wherein the power plant includes a first pressure sensor (PCUV) for measuring the pressure of the fluid in the tank and a second sensor (PFLU) per injector pipe for measuring the pressure of the fluid in each injector pipe.

10. A power plant according to claim 1, wherein the power plant includes a cooler device arranged on each injector pipe.

11. A power plant according to claim 1, wherein the power plant includes a thermally insulating piston arranged in the tank between the fluid and the gas coming from the engine, the piston separating and preventing contact between the fluid and the gas in the tank.

12. A power plant according to claim 11, wherein the power plant includes a manual activation system operable by a pilot, the manual activation system controlling a first gate valve positioned in the first pressurization pipe and a second gate valve positioned in the second pressurization pipe.

13. A power plant according to claim 1, wherein the tank is subdivided into two containers, each container being connected to a single injector pipe.

14. A power plant according to claim 1, wherein the power plant includes an emergency pipe fluidly connecting the tank to a main gearbox driven by the engines, wherein a gate valve is positioned between the tank and the main gearbox and is configured to control flow of the fluid through the emergency pipe.

15. An aircraft, wherein the aircraft includes a power plant according to claim 1.

16. A power plant according to claim 1, wherein each distributor has a body with an inlet orifice and an outlet orifice, a first port connected to the first pressurization pipe, and a second port connected to the second pressurization pipe, the body supporting the piston therein;
   wherein the piston in each distributor defines a non-through passage and a through passage; and
   wherein the pressure difference between the first and second pressurization pipes at the first and second ports of the body of the distributor moves the piston in each distributor so as to place one of the through passage or the non-through passage in register with the inlet orifice.

17. A power plant having a first turboshaft engine and a second turboshaft engine each having a gas generator, the power plant including an emergency system for injecting fluid into the engines, the system including a tank containing an aqueous fluid, wherein the power plant includes:
   a first pressurization pipe and a second pressurization pipe respectively connecting the tank to a first gas generator of the first engine and to a second gas generator of the second engine in order to pressurize the fluid in the tank with gas taken from each of the gas generators;
   one injector member per engine, each member comprising at least an injector nozzle for injecting the fluid, a first injector device having a first injector pipe connecting the tank to a first injector member of the first engine, a second injector device having a second injector pipe connecting the tank to a second injector member of the second engine; and
   a distributor arranged on each injector pipe, a first distributor of the first injector pipe communicating with the second pressurization pipe so that a failure of the second engine causes the first distributor to open, and a second distributor of the second injector pipe communicating with the first pressurization pipe so that the failure of the first engine causes the second distributor to open;
   wherein the power plant includes a thermally insulating piston arranged in the tank between the fluid and the gas coming from the engine, the piston separating and preventing contact between the fluid and the gas in the tank.

18. The power plant of claim 17 further comprising at least one computer;
   wherein each injector pipe including a metering valve controlled by the at least one computer to an adjustable flow rate of the fluid therethrough.

19. A power plant according to claim 17, wherein the power plant includes a manual activation system operable by a pilot, the manual activation system controlling a first gate valve positioned in the first pressurization pipe and a second gate valve positioned in the second pressurization pipe.

20. A power plant with an emergency system for injecting fluid into engines, the power plant comprising:
   a first turboshaft engine and a second turboshaft engine each having a gas generator;
   a tank containing an aqueous fluid;
   a first pressurization pipe and a second pressurization pipe respectively connecting the tank to a first gas generator of the first engine and to a second gas generator of the second engine in order to pressurize the fluid in the tank with gas taken from each of the gas generators;
   one injector member per engine, each member comprising at least an injector nozzle for injecting the fluid, a first injector device having a first injector pipe connecting the tank to a first injector member of the first engine, a second injector device having a second injector pipe connecting the tank to a second injector member of the second engine; and
   a distributor arranged on each injector pipe, a first distributor of the first injector pipe communicating with the second pressurization pipe so that a failure of the second engine causes the first distributor to open, and a second distributor of the second injector pipe communicating with the first pressurization pipe so that the failure of the first engine causes the second distributor to open, wherein each distributor is connected to the first pressurization pipe and to the second pressurization pipe such that each distributor is configured to receive gas from each of the gas generators and such that a pressure difference between the first and second pressurization pipes moves a piston in the associated distributor to control flow through the distributor.

21. The power plant of claim 20 further comprising a thermally insulating piston arranged in the tank between the fluid and the gas coming from the engines, the piston separating and preventing contact between the fluid and the gas in the tank.

* * * * *